(12) United States Patent
Flohr et al.

(10) Patent No.: US 6,845,141 B2
(45) Date of Patent: Jan. 18, 2005

(54) COMPUTED TOMOGRAPHY APPARATUS WHEREIN AN IMAGE OF A SUBJECT IS RECONSTRUCTED FOR A RECONSTRUCTION FIELD THAT IS LARGER THAN THE MEASURING FIELD

(75) Inventors: Thomas Flohr, Uehlfeld (DE); Bernd Ohnesorge, Erlangen (DE); Thomas von der Haar, Nürnberg (DE)

(73) Assignee: Siemens Aktiengesellschaft, Münich (DE)

( * ) Notice: Subject to any disclaimer, the term of this patent is extended or adjusted under 35 U.S.C. 154(b) by 69 days.

(21) Appl. No.: 10/048,516

(22) PCT Filed: May 17, 2001

(86) PCT No.: PCT/DE01/01888

§ 371 (c)(1),
(2), (4) Date: Jun. 11, 2002

(87) PCT Pub. No.: WO01/93201

PCT Pub. Date: Dec. 6, 2001

(65) Prior Publication Data

US 2002/0186809 A1 Dec. 12, 2002

(30) Foreign Application Priority Data

May 30, 2000 (DE) .......................................... 100 26 566

(51) Int. Cl.⁷ .............................................. G01N 23/00
(52) U.S. Cl. ............................................................ 378/4
(58) Field of Search ....................................... 378/4–20

(56) References Cited

U.S. PATENT DOCUMENTS

| 4,228,505 A | 10/1980 | Wagner |
| 4,305,127 A | 12/1981 | Heuscher |
| 4,333,145 A | 6/1982 | Heuscher et al. |
| 5,640,436 A | 6/1997 | Kawai et al. |
| 6,307,909 B1 | 10/2001 | Flohr et al. |

FOREIGN PATENT DOCUMENTS

| EP | 0 428 348 | 5/1991 |
| EP | 0 971 318 | 1/2000 |
| GB | 2 014 016 | 8/1979 |

Primary Examiner—Craig E. Church
(74) Attorney, Agent, or Firm—Schiff Hardin LLP

(57) ABSTRACT

A computed tomography apparatus has a radiation source from which a beam is emitted which has a fan angle and can be moved about a system axis within a measuring field defined by the fan angle in order to scan an object under examination, and a detector system for detecting the radiation from the radiation source and which supplies output signals corresponding to the received radiation, which are fed to a computer. From these output signals, the computer reconstructs images of the object under examination with reference to a reconstruction field which is larger than the measuring field.

13 Claims, 7 Drawing Sheets

COMPUTED TOMOGRAPHY APPARATUS WHEREIN AN IMAGE OF A SUBJECT IS RECONSTRUCTED FOR A RECONSTRUCTION FIELD THAT IS LARGER THAN THE MEASURING FIELD

BACKGROUND OF THE INVENTION

1. Field of the Invention

The present invention relates to a computed tomography apparatus of the type having a radiation source which emits an X-ray beam a fan angle and which can be rotated around a system axis within a measuring field defined by the fan angle in order to scan an object under examination, and having a detector system, which is provided for detecting the radiation issuing from the radiation source and which supplies output signals corresponding to the received radiation to a computer that reconstructs images of the object under examination from data corresponding to the output signals.

2. Description of the Prior Art

Computed tomography is an imaging method for producing sectional images that is used principally in the medical field.

In a computed tomography apparatus of the type described above as disclosed in German OS 198 35 296, the size of the circular reconstruction field with respect to which images can be reconstructed is limited by the likewise circular measuring field, which is inscribed in the fan angle of the X-ray beam. In order to enlarge the reconstruction field, the fan beam angle and, correspondingly, the detector must be enlarged. This makes it clear that enlarging the reconstruction field leads, in particular, to substantial costs on the detector side.

SUMMARY OF THE INVENTION

An object of the present invention is to provide a computed tomography apparatus of the type described above wherein an enlargement of the reconstruction field is possible in a cost-effective way.

This object is achieved in a computed tomography apparatus according to the invention wherein the computer reconstructs images, while retaining the fan angle and the detector geometry, on the basis of data corresponding to the output signals of the detector system, with respect to a reconstruction field which is larger than the measuring field inscribed in the fan angle. It is possible in this way to realize an enlarged reconstruction field, and also to represent regions of an object under examination that are located outside the circle inscribed in the fan angle, without the need to enlarge the detector system and thus without incurring the extra costs associated therewith. Since the fan angle is not enlarged, the radiation dose (patient dose) fed to the object under examination remains constant.

In a preferred embodiment of the invention, the enlarged reconstruction field is realized by the computer obtaining the data relating to the region of the reconstruction field lying outside the measuring field by extrapolation starting from data picked up during scanning of the measuring field, if the data relating to the reconstruction of the region of the reconstruction field lying outside the measuring field is not obtained during scanning of the measuring field. Use is made in this case of the circumstance that during scanning of the measuring field there is also a partial scanning of regions of the object under examination that are located outside the measuring field, and it is therefore necessary to obtain by extrapolation only a portion of the data required for the reconstruction of images with an enlarged reconstruction field. Since it follows therefrom that the data used for the reconstruction of images with the enlarged reconstruction field are obtained only partially by extrapolation, it is possible according to the invention to reconstruct images with few artifacts despite the partial extrapolation of data.

In a preferred embodiment of the invention, the computer obtains the data relating to the region of the reconstruction field lying outside the measuring field by extrapolation of cut projections, for example by the computer detecting cut projections and extrapolates the data for detected cut projections relating to the region of the reconstruction field lying outside the measuring field. It is thus ensured that the extrapolation of data is limited to the extent that is absolutely necessary. The extrapolation of data in the case of cut projections is known in general from European Application 0 030 143.

The measuring field and the reconstruction field likewise preferably have a circular contour and are arranged concentrically with one another, which can be achieved, for example, when the beam is emitted from the focus of the radiation source, for example an X-ray radiation source, which can be moved on a circular track about the system axis.

DESCRIPTION OF THE PREFERRED EMBODIMENTS

Figure 1:
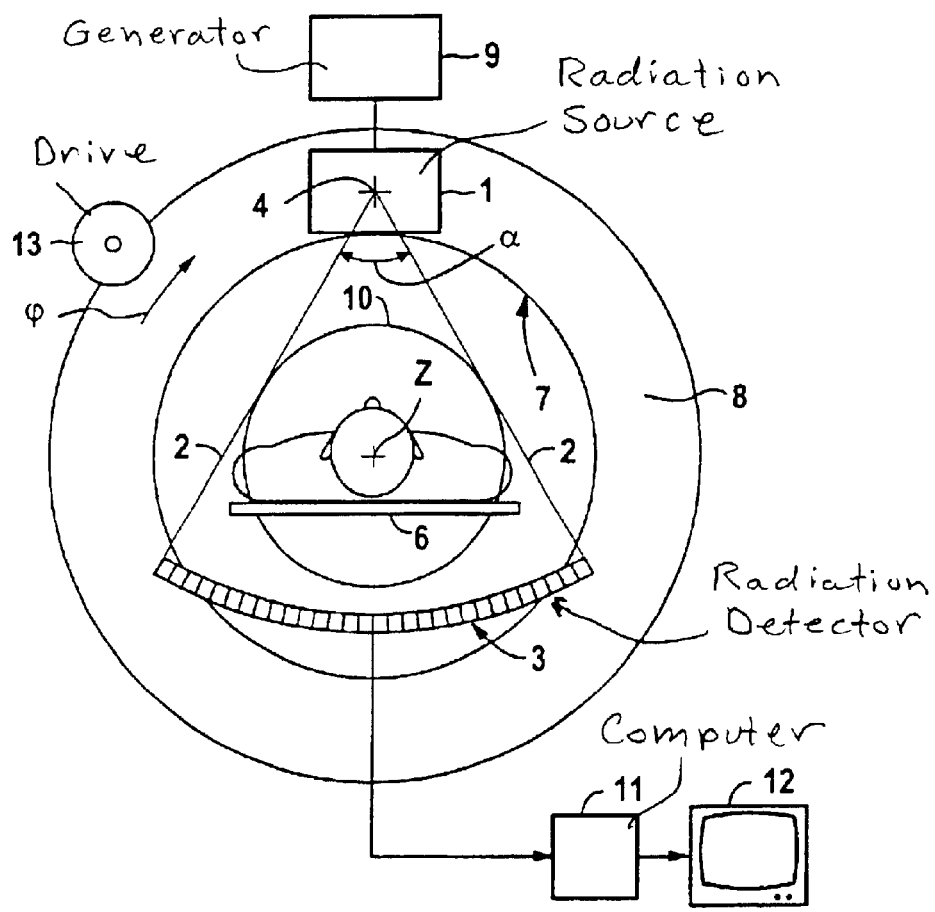
FIG. 1 is a block diagram showing a computed tomography apparatus in accordance with the invention.

The X-ray computed tomography apparatus illustrated in FIG. 1 has a measuring unit composed of an X-ray radiation source 1, which emits a fan-shaped X-ray beam 2 with a fan angle α, and a detector 3, which is assembled one or more rows of individual detectors, for example in each case 512 individual detectors, arranged sequentially in the direction of the system axis. The focus of the X-ray radiation source 1, from which the X-ray beam 2 is emitted, is denoted 4. The object 5 under examination, a human patient in the case of the exemplary embodiment illustrated, lies on a support table 6 which extends through the measuring opening 7 of a gantry 8.

The X-ray radiation source 1 and the detector 3 are mounted opposite one another on the gantry 8. The gantry 8 is mounted such that it can rotate around the z-axis (system axis), denoted by z, of the apparatus, in order to scan the object 5 under examination in the φ-direction, specifically by an angle which is at least equal to 180° plus the fan angle α. In this case, the X-ray beam 2 is emitted from the focus 4, moved on a circularly curved focal track 15 with the X-ray radiation source 1 operated by means of a generator device 9, so as to cover a measuring field 10 of circular cross section.

Projections are recorded for predetermined angular positions of the measuring unit 1, 3, known as projection angles the data corresponding to the associated output signals of the detector 3 passes from the detector 3 to an electronic computer 11 which reconstructs from the data corresponding to the projections the attenuation coefficients of the pixels of a pixel matrix and reproduces the latter pictorially on a display unit 12, on which images of the transirradiated layers of the object 5 under examination therefore appear. As an example, a complete projection is denoted in FIG. 2 by $p_{full}$ and a cut projection by $p_{cut}$.

Each projection p(l,k) is assigned to a specific angular position in the φ-direction, i.e. a projection angle 1 and has a number, corresponding to the number of the detector elements, what is termed the channel number $N_S$, of measurement points to which in each case the corresponding measured value is assigned. The channel index $k=0(1)(N_S-1)$ specifies from which of the detector elements a measured value originates.

Since the detector 3 can have a number of rows of detector elements, it is possible, if necessary, simultaneously to record a number of layers of the object 5 under examination, the number of projections corresponding to the number of the active rows of detector elements then being recorded per projection angle.

Moreover, spiral scans can be carried out when the drive 13 assigned to the gantry 8 is suitable for continuously rotating the gantry and, furthermore, a further drive is provided which permits a relative displacement of the support table 6, and thus of the object 5 under examination, and the gantry 8 with the measuring unit 1, 3, in the z-direction.

Figure 2:
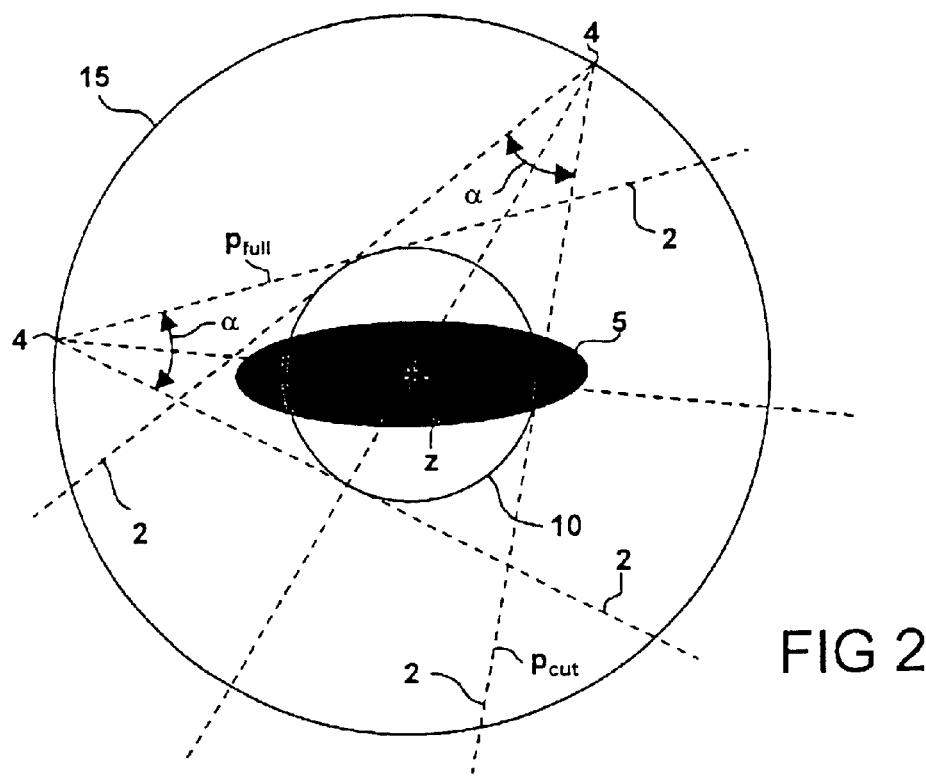
FIG. 2 illustrates the difference between a complete projection and a cut projection.

In situations in which, as illustrated in FIG. 1, the object 5 under examination has dimensions such that it exceeds the measuring field 10, it is not possible in conventional computed tomography systems to reconstruct images free from artifacts without special measures, since, as can be seen from FIG. 2, at least some of the projections are not complete projections, that is to say projections which cover the entirety of the object 5, but are cut projections in which the measuring field is exceeded because they do not cover regions of the object 5 that lie outside the measuring field 10. As an example, a complete projection is denoted in FIG. 2 by $p_{full}$ and a cut projection by $p_{cut}$.

Figure 3:
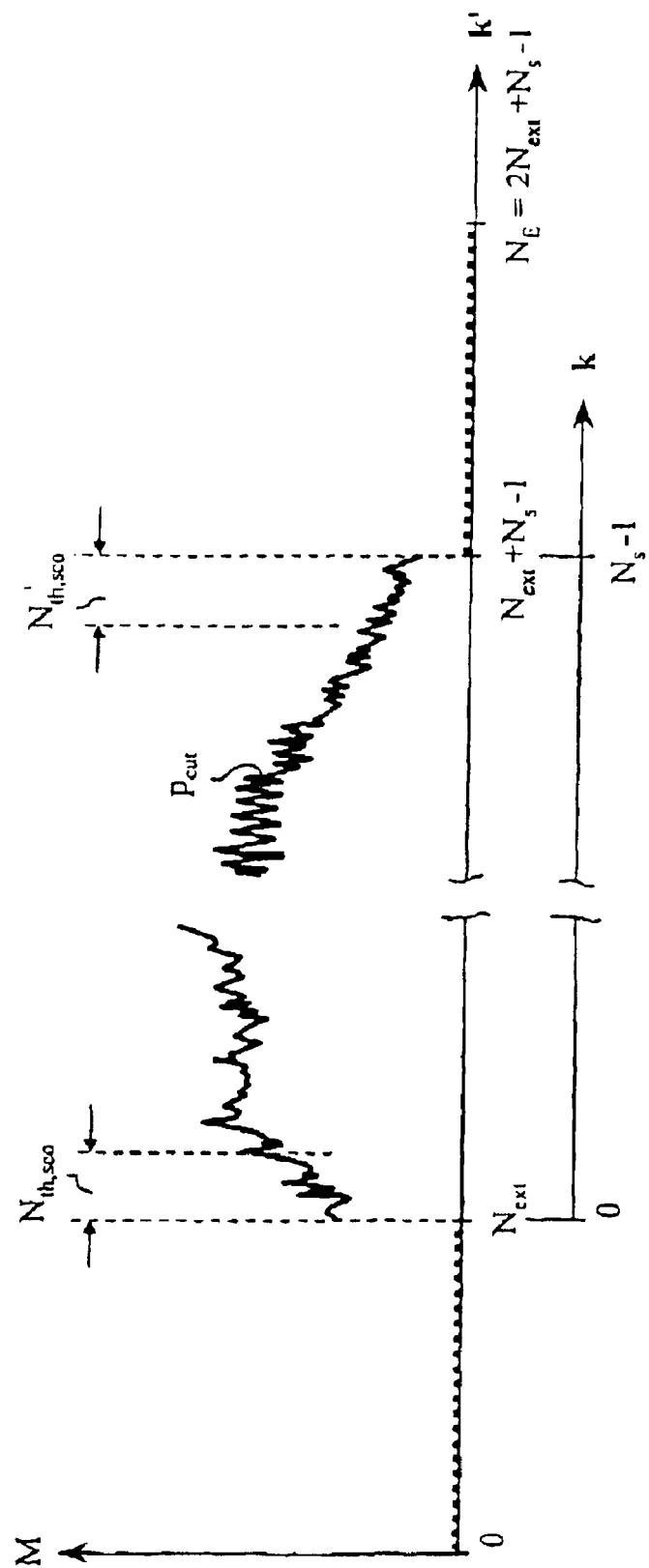
FIG. 3 illustrates the variation in the measured values of a cut projection.

FIG. 3 shows with a continuous line the typical variation in the measured values of a cut projection $p_{cut}$, the measured value M being plotted against the channel index k. The projection has $N_S$ measured channels with the channel indices k=0, 1, 2, . . . $N_S$-1. The channel number $N_S$ corresponds to the diameter $D_M$ of the measuring field 10 entered in FIG. 4.

As already mentioned, in conventional image-reconstruction methods, cut projections cause pronounced image artifacts which strongly impair the representation of the object 5 under examination even within the measuring field 10. Moreover, regions of the object 5 under examination that are located outside the measuring field 10 are excluded from the reconstruction.

In the computed tomography apparatus according to the invention, cut projections are detected by the electronic computer 11 as described in more detail below.

Moreover, can be seen from FIG. 3, the computer 11 extends at least the detected cut projections p(l, k) to produce what are termed extended projections $p_{ext}(l,k')$ by respectively adding a number of channels $N_{ext}$ symmetrically at the start and at the end of a projection. Thus an extended projection has the extended channel number $N_E$, of which the channel indices k=0, 1, 2, . . . ($N_S+2N_{ext}-1$). The extended channel number $N_E$ corresponds to an extended measuring field $D_E$, which is shown in FIG. 4.

The measured values belonging to the channels additionally included in an extended projection $p_{ext}(l,k')$ are obtained by the computer 11 by extrapolation as described in more detail below, if the respective projection is a cut projection detected by the computer 11. By contrast, the computer 11 sets the measured values belonging to the channels additionally included in an extended projection to zero when the respective projection is a complete projection.

Figure 4:
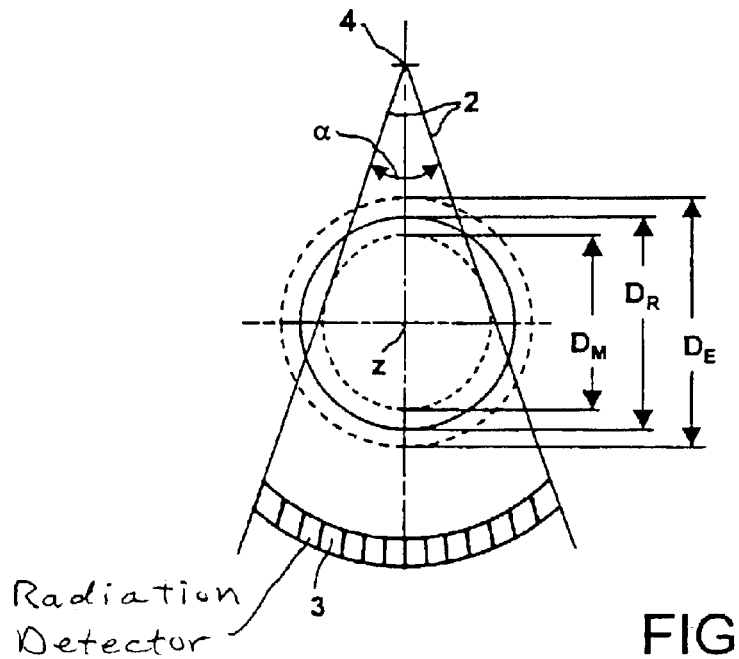
FIG. 4 illustrates the geometry of a reconstruction field in accordance with the invention.

Thus, in addition to the data referring to the measuring field $D_M$ that are present in any case, the computer 11 generates data for an extended measuring field, entered in FIG. 4, of diameter $D_E$.

Figure 5:
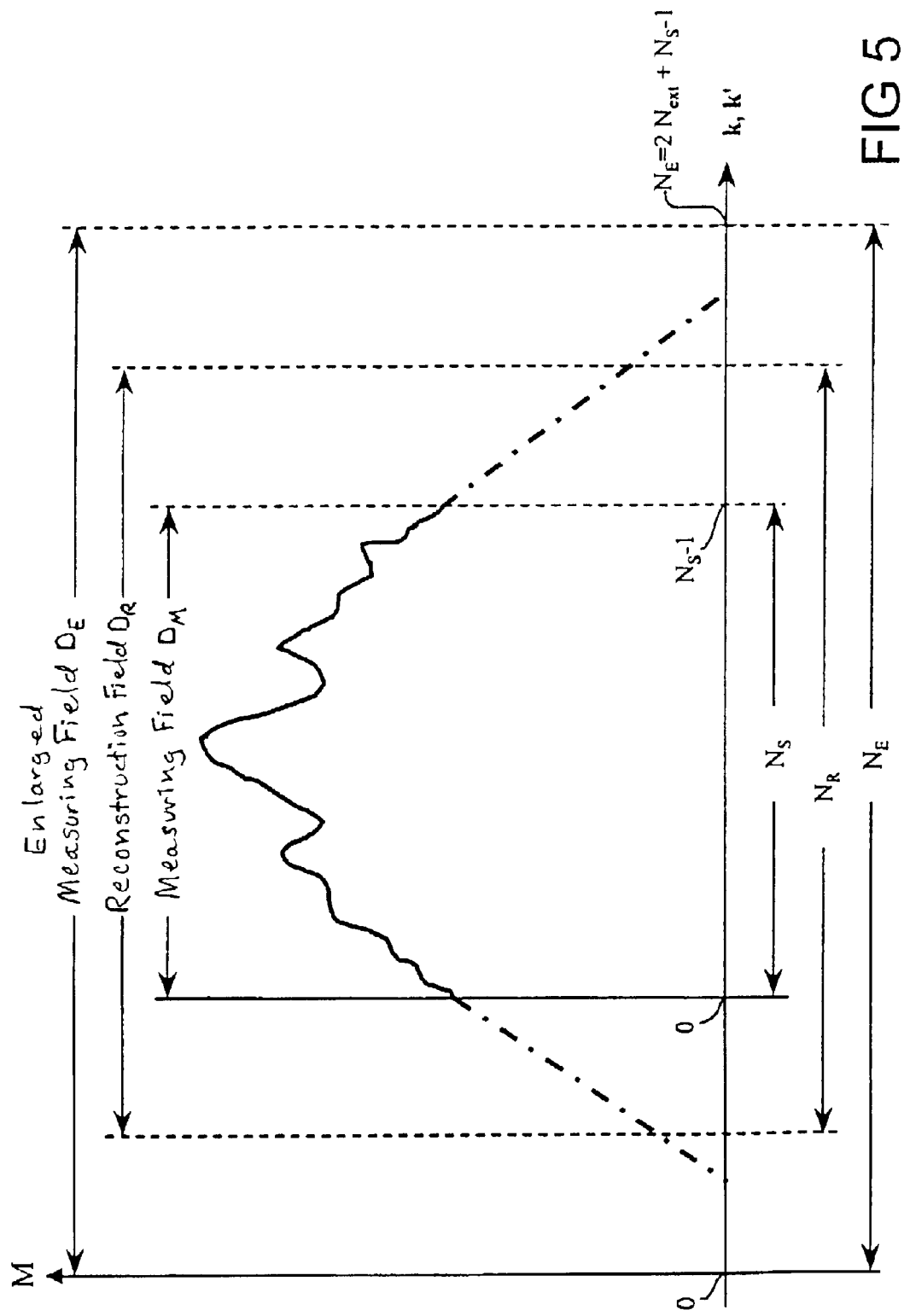
FIG. 5 illustrates the geometry of an extended projection in accordance with the invention.

An extended projection including the extrapolated data is illustrated in FIG. 5. The extrapolated data are used by the computer 11 according to the invention in order to reconstruct images of the object 5 under examination in a reconstruction field, illustrated in FIG. 4, of diameter $D_R>D_M$, the reconstructed channel number $N_R$ corresponding to the reconstruction field $D_R$, $N_R \leq (N_S+2N_{ext})$.

However, as is illustrated in FIG. 5, for good image quality in the region of the edge of the measuring field, $(N_S+2N_{ext})>N_R$ should hold.

In the exemplary embodiment $(N_S+2N_{ext})=1.2 \cdot N_S$, that is to say $D_E=1.2 \cdot D_M$, and $N_R=1.1 \cdot N_S$, i.e. $D_R=1.1 \cdot D_M$.

Due to the extrapolation, the data referring to the region, located outside the measuring field (i.e., of the reconstruction field or of the extended measuring field) are merely estimated values. The latter will occasionally deviate from the data which would be measured with the aid of a real detector, and this leads to falsifications in the reconstructed image. As already explained, the reconstruction of a pixel outside the measuring field is based, however, not only on the data obtained by extrapolation. Rather, as can be seen from FIG. 2, even parts of the object 5 under examination that lie outside the measuring field are covered by the beam in a large number of some complete projecting and some cut projections, and thereby contribute to the data corresponding to these projections. Thus the contribution of the data obtained by extrapolation is limited to an image reconstructed by the reconstruction field, such that the object 5 under examination is imaged largely without falsification.

The computer 11 proceeds as follows in extending projections, detecting cut projection and extrapolating:

An interval, illustrated in FIG. 3, of $N_{th,sco}$ measurement points is investigated at the start and end of the respective projection in order to detect cut projections. If the mean value $M_A(l)$ or $M_E(l)$ in accordance with equations (1a) and (1b) of the first or last $N_{th,sco}$ measurement points lies above a predefined threshold value $S_{th,sco}$, it is assumed that a cut projection is present:

$$M_A(l) = \frac{1}{N_{th,sco}} \cdot \sum_{k=0}^{N_{th,sco}-1} p(l,k) \tag{1a}$$

$$M_E(l) = \frac{1}{N_{th,sco}} \cdot \sum_{k=0}^{N_{th,sco}-1} p(l, N_s - 1 - k) \tag{1b}$$

A sensible choice of parameter for $N_{th,sco}$ is $N_S/150$, for example. For example, the attenuation value of approximately 5 mm $H_2O$ can be used for $S_{th,sco}$.

The channels relating to the extended measuring field, of the projections extended at the start and end initially include the measured value zero as is illustrated by dots in FIG. 3. Equation (2) yields the extended projection $p_{ext}(l,k')$ with channel indices $k'=0(1)(N_S+2N_{ext}-1)$:

$$p_{ext}(l,k') = \begin{cases} 0, & k' = 0(1)(N_{ext}-1) \\ p(l, k'-N_{ext}), & k' = N_{ext}(1)(N_S+N_{ext}-1) \\ 0, & k' = (N_S+N_{ext})(1)(N_S+2N_{ext}-1) \end{cases} \tag{2}$$

The suitable selection of the extension parameter $N_{ext}$ will be explained in more detail below.

In the following step, the "measured values" of the "measurement point" to be added to the detected cut projections are determined by extrapolation for the cut projections detected in the previously described way. Although these are not actually measured data, measurement points and measured values will be spoken of below, nevertheless.

The extrapolation of the measurement points must ensure a uniform transition of the corresponding measured values to zero. FIG. 2 shows for this purpose the relationships, in principle, for an extrapolation within the intervals at the start and end of a projection with $N_{ext}$ measurement points.

Figure 6:
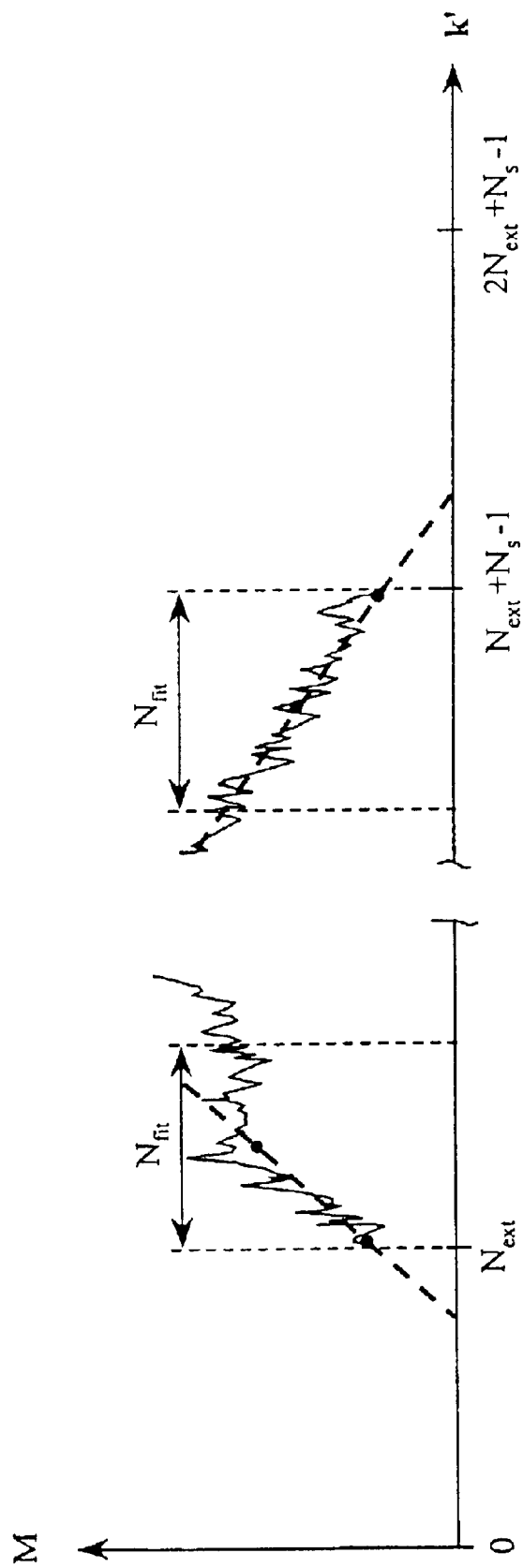
FIG. 6 illustrates a first embodiment for extrapolating the measurement points in accordance with the invention.

A first simple possibility of extrapolation is a linear fit, illustrated in FIG. 6, to the first and last measurement points of the projection in the interval $k' \in [N_{ext}(1)(N_{ext}+N_{fit}-1)]$ or $k' \in [(N_{ext}+N_S-N_{fit})(1)(N_{ext}+N_S-1)]$. The extrapolated regions are calculated using the coefficients $c_{0,A}, c_{1,A}$ or $c_{0,E}, c_{1,E}$ in accordance with equations (3a) and (3b):

$$\tilde{p}_{ext}(l,k') = c_{0,A}(l) + c_{1,A}(l) \cdot k', \quad k'=0(1)(N_{ext}-1) \tag{3a}$$

$$\tilde{p}_{ext}(l,k') = c_{0,E}(l) + c_{1,E}(l) \cdot k', \quad k'=(N_S+N_{ext})(1)(N_S+2N_{ext}-1) \tag{3b}$$

The coefficients can be calculated by determining the minimum sum of the quadratic deviations. A simpler alternative is to calculate the mean value of the measurement points in the window of width $N_{fit}$ at the ends of the projection. Together with the first and last valid measurement point, the mean values then determine the coefficients for the linear fit.

A fit of higher order (for example parabolic fit) of the $N_{fit}$ measurement points $k' \in [N_{ext}(1)(N_{ext}+N_{fit}-1)]$ at the start of the projection and the measurement points $k' \in [(N_{ext}+N_S-N_{fit})(1)(N_{ext}+N_S-1)]$ at the end of the projection can also be carried out by analogy with the linear fit described above. The extrapolation equations (4a) and (4b):

$$\tilde{p}_{ext}(l,k') = c_{0,A}(l) + c_{1,A}(l) \cdot k' + c_{2,A}(l) \cdot (k')^2, \quad k'=0(1)(N_{ext}-1) \tag{4a}$$

$$\tilde{p}_{ext}(l,k') = c_{0,E}(l) + c_{1,E}(l) \cdot k' + c_{2,E}(l) \cdot (k')^2, \quad k'=(N_S+N_{ext})(1)(N_S+2N_{ext}-1) \tag{4b}$$

hold for a parabolic fit, as an example.

The coefficients can be calculated, in turn, by determining the minimum sum of the quadratic deviations, or by calculating the mean values within, in each case, two windows with $N_{fit}$ measurement points at the ends of the projection. The parabolic coefficients are then obtained from the mean values and the first and last valid measurement point of the projection.

Figure 7:
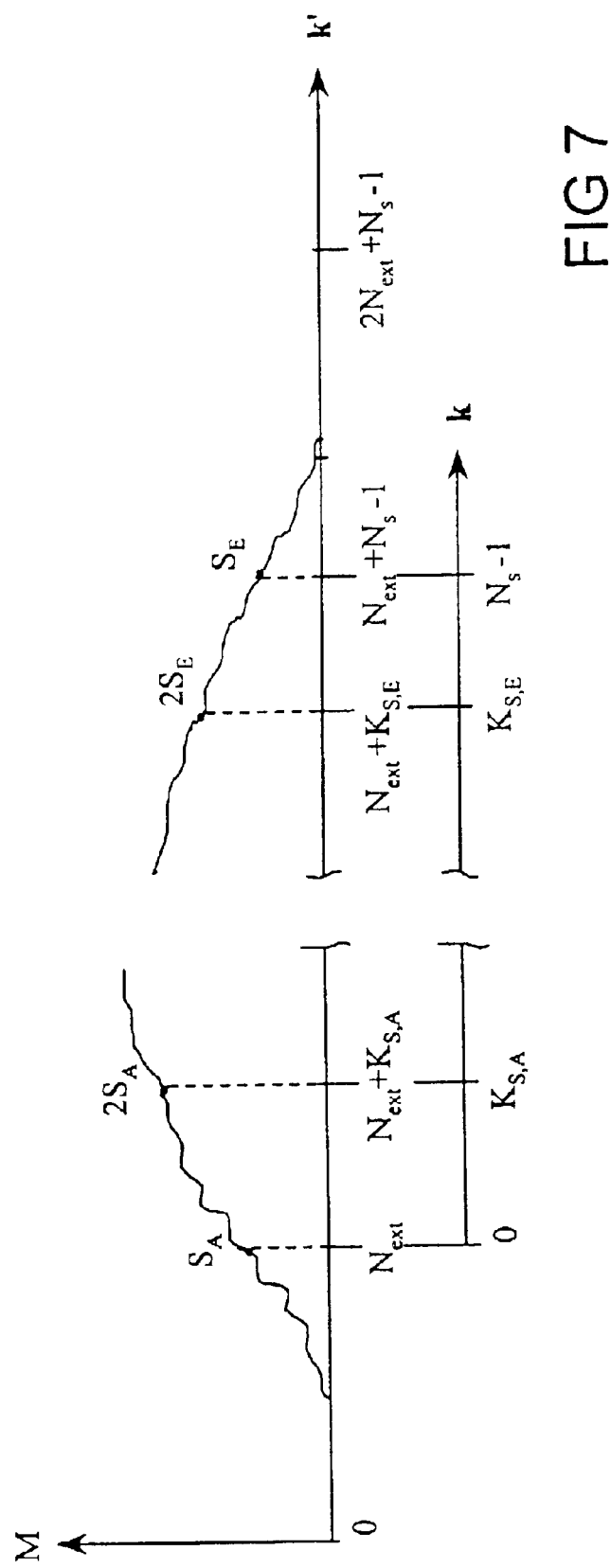
FIG. 7 illustrates a second embodiment for extrapolating the measurement points in accordance with the invention.

A preferred type of extrapolation is the symmetrical extrapolation illustrated in FIG. 7.

In this approach, the valid measurement points at the start and end of the projection are copied by reflection at the first and last measurement point of the projection as a continuation of the measured projection into the extrapolation interval. Equations (5a) and (5b) describe the extrapolation rule of this approach, which has a very low computational outlay. Equation (5a) relates to the start of the projection, and equation (5b) to the end of the projection:

$$\tilde{p}_{ext}(1,N_{ext}-k)=2S_A(l)-p(l,k), \quad k=1(l)K_{S,A} \tag{5a}$$

$$\tilde{p}_{ext}(1,2N_S+N_{ext}-2-k)=2S_E(l)-p(l,k), \quad k=(N_S-2)(-1)K_{S,E} \tag{5b}$$

In this case, $S_A$ and $S_E$ are the values of the first and last, respectively, valid measurement point of the projection p(k) considered, with $S_A=p(0)$, $S_E=p(N_s-1)$. $K_{S,A}$ and $K_{S,E}$ are the indices of the first and last measurement points which, with $p(K_{S,A})>2S_A$ and $p(K_{S,E})>2S_E$, respectively, overshoot the threshold values $2S_A$ and $2S_E$, respectively. The "threshold indices" must in this case be limited to $K_{S,A} \leq N_{ext}$ or $K_{S,E} N_S - N_{ext} - 1$. It may be pointed out again that FIG. 7 illustrates the extrapolation, given by equations (5a) and (5b), with measurement point mirroring. It can be seen that mirroring is firstly performed at a straight line running through the first and last measured measurement point parallel to the axis, corresponding to the measured value, of the rectangular coordinate system of FIG. 7, and then at a straight line running parallel to the axis corresponding to the channel index k or k' through the first and last measured measurement point.

By contrast with the two other approaches described, the approach of symmetrical extrapolation has the advantage of a steady transition at the ends of the projection. Moreover, the noise response of the projection is maintained in the extrapolation interval.

In order to ensure uniform transitions of the extrapolated measurement points to zero, the extrapolation intervals are also weighted in accordance with equations (6a) and (6b) with the aid of attenuation factors $w_A(k')$ and $w_E(k')$ respectively. It holds in this case for the attenuation factors $w_A(0)=0$, $w_A(N_{ext}-1)=1$, $w_E(N_S+2N_{ext}-1)=0$ and $w_E(N_S+N_{ext}-1)=1$ that:

$$p_{ext}(l,k') = \tilde{p}_{ext}(l,k') \cdot w_A(k'), \quad k'=0(1)(N_{ext}-1) \tag{6a}$$

$$p_{ext}(l,k') = \tilde{p}_{ext}(l,k') \cdot w_E(k'), \quad k'=(N_S+N_{ext})(1)(N_S+2N_{ext}-1) \tag{6b}$$

It is possible, for example, to use co-sinusoidal functions in accordance with equations (7a) and (7b) for $w_A(k')$ and $w_E(k')$, respectively:

$$w_A(k') = \left( \sin \frac{k' \cdot \pi}{2(N_{ext}-1)} \right)^{t_{cos}} \tag{7a}$$

$$w_E(k') = \left( \cos \frac{(k'-N_s-N_{ext}) \cdot \pi}{2(N_{ext}-1)} \right)^{t_{cos}} \tag{7b}$$

The co-sinusoidal attenuation vectors can be calculated in advance and stored for prescribed extrapolation parameters. The parameter $t_{cos}$ is selected, for example, in an interval $t_{cos} \in [0.5;3]$.

For optimum image quality for the object 5 under examination with strongly variable structures at the edge of the measuring field (for example shoulder, skull), it is expedient to estimate the extent in the cut projections to which the object 5 under examination exceeds the measuring field in a projection under consideration for the purpose of subsequently adapting the extrapolation parameters for the extrapolation of this projection. It is possible in this case, for example, to vary the parameters $N_{ext}$ and $t_{cos}$, or to vary the range of the attenuation factors $w_A$ and $w_E$, respectively, as a function of a suitable measure of the extent to which the measuring field is exceeded, and of the object structure at the two edges of the projection. In the exemplary embodiment, use is made as the measure of the ratio of the measured value and the edge of the projection to the maximum measured value of the projection, and of the number of the channels in the intervals $[0;K_{S,A}]$ and $[K_{S,E};N_S-1]$.

The sequences of measurement points in the [electronic] computer 11 that represent the projections proceed through a chain of a number of processing steps during the image reconstruction. The last step in the chain of the direct calculation of the CT image, for example by back projection, is the filtering of the projections with a convolution kernel of high-pass type. In the case of cut projections, this is the cause of the artifacts which occur. In the invention the extrapolation can be performed basically at any time before the convolution in the reconstruction chain. However, in the exemplary embodiment, the extrapolation does not take place until as late as possible, i.e., directly before the convolution, in order not to increase unnecessarily the data volume to be processed, and thus the computational outlay, in the preceding steps.

Filtering with the convolution kernel requires projections of length $N_S$ to be brought to the convolution length $L_F \geq 2N_S-1$ (convolution-length limit) by adding measurement points with the value zero in order to avoid aliasing errors. $L_F \geq 2(N_S+2N_{ext})-1$ must then hold for the convolution length as regards the projections extended by extrapolation. In general, projections are filtered by multiplication of the discrete spectra in the frequency domain. The discrete projection spectra are calculated as "Fast Fourier Transforms" (FFTs) of length $L_{FFT}$. In this case, for example in the use of what is termed the Radix2-FFT, $L_{FFT}$ must satisfy the equation $L_{FFT}=2^{cell(1d(2NS-1))}$ (1d(x)=logarithm to the base of numeral two of x, cell(x)=x rounded up to the next larger whole number). If the channel number $N_S$ of the projections does not correspond to the power of two, projections can be extrapolated in the "difference interval" without causing an enlargement of the FFT length, and thus increasing the computational outlay. The limitation of the extrapolation range, described by $N_{ext}$, is given by equation (8):

$$N_{ext} = \frac{1}{2} \cdot \left(\frac{L_{FFT}}{2} - N_s\right) \quad (8)$$

If the channel number of a projection exceeds the convolution-length limit, the filtering causes aliasing errors in the edge region of the projections. Typically, such aliasing errors in the reconstructed images are expressed as a decrease in the CT value level toward the edge of the measuring field. Should the channel number of the projections under consideration be very close to a power of two, the extrapolation step possibly requires violation of the convolution-length limit with $2(N_S+2N_{ext})-1>L_F$. Since cut projections lead to an increase in the CT value in the outer region of the measuring field, the opposite effect of the aliasing can be utilized for the purpose of partial compensation. Given a suitable selection of the extrapolation interval, represented by $N_{ext}$, and a moderate level of exceeding the convolution length limit, an excellent image quality is achieved at the edge of the measuring field. Artifacts caused by cut projections are eliminated, whereas aliasing artifacts do not appear. It is therefore possible to avoid an increase in the convolution length $L_F$ and thus in the increased computational outlay connected therewith.

The extrapolation methods described are to be understood as an example; other approaches are possible within the scope of the invention. However, the approaches described are regarded as particularly advantageous in relation to the computational outlay to be made, and to the achievable image quality.

Figure 8:
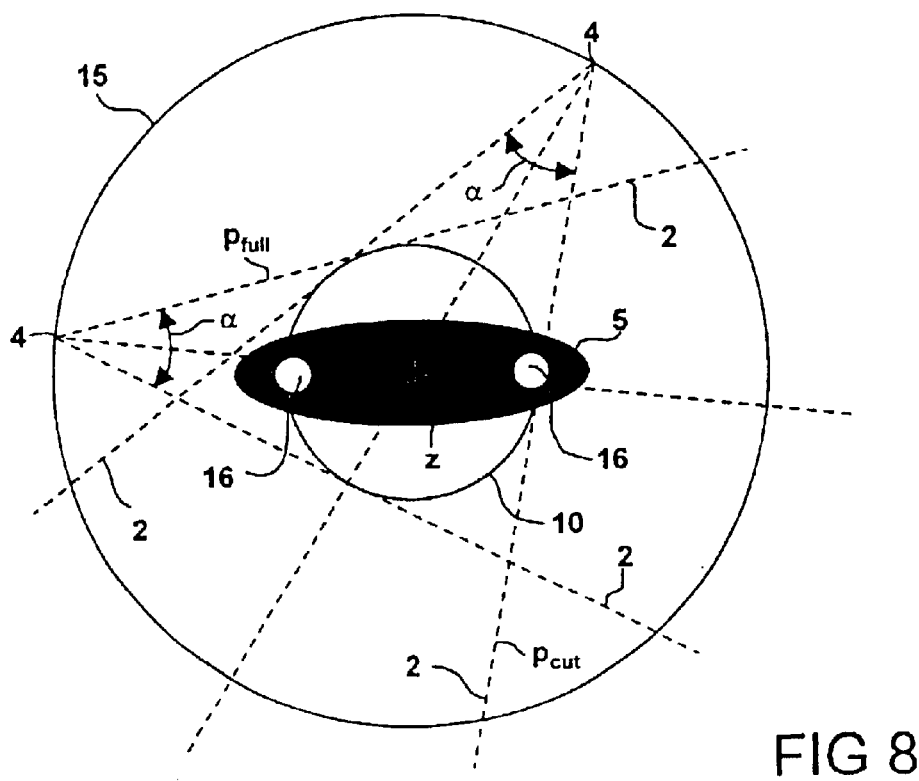
FIG. 8 illustrates a first type of examination which can be conducted using the computed tomography apparatus of the invention.

The functionality of the invention is demonstrated below with the aid of two exemplary embodiments having high requirements:

As an example, FIG. 8 shows an examination of the shoulder region of a human patient, whose scapula 16 are located partially outside the measuring field. This inhomogeneous structure at the edge region of the measuring field entails certain inaccuracies in the estimation of the data in the cut projections. Because of the generally elliptical form of the shoulder region, however, it is to be expected at the same time that the measuring field will be exceeded only in the region of the scapulae. In a way similar to that illustrated in FIG. 3, the proportion of the data that are obtained by extrapolation and contribute in the image reconstruction to the image region lying outside the measuring field is limited to a few projections. In a majority of the projections, the object part lying outside the measuring field is within the regular radiation fan and therefore supplies correct contributions to the measured data. Taking the two aspects into consideration, it is therefore possible to assume that the object is reproduced in a largely faithful fashion outside the measuring field.

Figure 9:
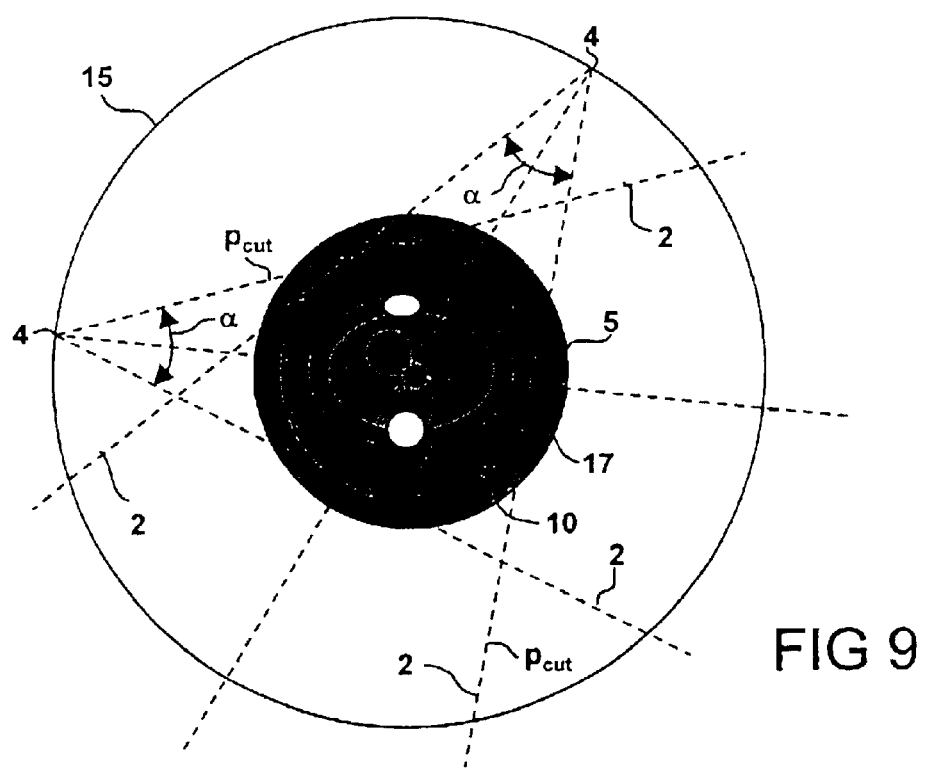
FIG. 9 illustrates a second type of examination which can be conducted using the computed tomography apparatus of the invention.

FIG. 9 illustrates an examination in the abdominal region of a patient which exceeds the measuring field over the entire extent thereof. The contribution of extrapolated data to image reconstruction is thus considerable. However, as a rule there are no inhomogeneous structures present in the edge region of the measuring field in this anatomical region, but at least a substantially homogeneous tissue 17, and so the extrapolation algorithm can supply a very good approximation of the data. Consequently, in this extreme case, as well, a correct reconstruction of the object 5 is also to be expected outside the measuring field.

In the exemplary embodiment, the extrapolation takes place directly upstream of the filtering of the projections with the aid of the convolution core. However, it is also possible within the scope of the invention to undertake the extrapolation at a different point of the processing chain.

The exemplary embodiment relates to the medical application of the method according to the invention by using CT technology. However, this can also be applied in the case of other tomographic imaging methods, as well as in the non-medical field.

In the above-described exemplary embodiment, the invention is described for fan-beam geometry, i.e., a projection is composed of a number of beams issuing from the respective focal position that corresponds to the channel number. However, the invention also can be applied in the case of parallel beam geometry. In this case, a projection is composed of a number of parallel beams that corresponds to the channel number, the middle one of which beams issues from the respective focal position. Projection in parallel-beam geometry are obtained from projection in fan-beam geometry by the known computing operation that is termed rebinning.

In the exemplary embodiment, the relative movement between the measuring unit 1, 3 and the bearing table 6 is produced by the displacement of the bearing table 6. However, it is also possible within the scope of the invention to leave the bearing table 6 fixed and to displace the measuring unit 1, 3 instead. Moreover, it is possible within the scope of the invention to produce the required relative movement by displacing both the measuring unit 1, 3 and the bearing table 6.

The above-described exemplary embodiment is a 3rd generation computed tomography apparatus, meaning that the X-ray radiation source and the detector system are rotated jointly around the system axis during the image generation. However, the invention also can be applied in conjunction with 4th generation CT units in the case of which only the X-ray radiation source is rotated around the system axis and cooperates with a fixed detector ring, provided that the detector system is a planar array of detector elements.

The invention also can be used with 5th generation CT units, wherein the X-ray radiation is emitted from a number of foci of one or more X-ray radiation sources displaced about the system axis, provided that the detector system has a planar array of detector elements.

The above described computed tomography apparatus has a detector system with detector elements arranged in the manner of an orthogonal matrix. However, the invention also can be used in conjunction with a detector system that has detector elements arranged in another way other than a planar array, or in the form of a single row.

Although modifications and changes may be suggested by those skilled in the art, it is the intention of the inventors to embody within the patent warranted hereon all changes and modifications as reasonably and properly come within the scope of their contribution to the art.

What is claimed is:

1. A computed tomography apparatus comprising:
   a radiation source which emits a radiation beam from a focus, said radiation beam having a fan angle and at least said focus being displaceable relative to a system axis to irradiate a measuring field, defined by said fan angle, from a plurality of different directions for scanning an object adapted to be located in said measuring field and to at least partially irradiate a portion of said object disposed beyond said measuring field;
   a radiation detector on which said radiation beam is incident after passing through said measuring field and said portion of said object disposed beyond said measuring field, said radiation detector generating output electrical signals corresponding to radiation in said radiation beam incident on said radiation detector; and
   a computer connected to said radiation detector and supplied with said electrical output signals, said computer reconstructing an image of said object from data represented by said electrical output signals for a reconstruction field which is larger than said measuring field, said reconstruction field including said portion of said object beyond said measuring field.

2. A computed tomography apparatus as claimed in claim 1 wherein said computer generates data representing a region of said reconstruction field lying outside of said measuring field by an extrapolation procedure starting from said data represented by said output signals from said radiation detector in said measuring field.

3. A computed tomography apparatus as claimed in claim 2 wherein said data represented by said output signals of said radiation detector include data representing cut projections of said object, and wherein said computer generates said data relating to said region of said reconstruction field lying outside of said measurement field by extrapolation of said cut projections.

4. A computed tomography apparatus as claimed in claim 3 wherein said computer detects said cut projections.

5. A computed tomography apparatus as claimed in claim 1 wherein said radiation source is an X-ray source and wherein said radiation beam is an X-ray beam.

6. A computed tomography apparatus as claimed in claim 1 wherein at least said focus of said X-ray source is rotated around said system axis to transirradiate said object in a circular measuring field, and wherein said computer reconstructs said image in a circular reconstruction field, with said measuring field and said reconstruction field being concentric.

7. A computed tomography apparatus as claimed in claim 6 wherein at least said focus of said X-ray source is rotated along a circular path around said system axis.

8. A method for operating a computed tomography apparatus comprising the steps of:
   emitting a radiation beam, having a fan angle, from a focus of a radiation source;
   displacing said focus of said X-ray source relative to a system axis to irradiate a measuring field from a plurality of different directions to scan an object disposed in said measuring field and to at least partially irradiate a portion of said object disposed beyond said measuring field;
   detecting radiation in said radiation beam after passing through said measuring field and generating electrical signals corresponding to the detected radiation; and
   electronically reconstructing an image of said object from data represented by said output signals for a reconstruction field which is larger than said measuring field, said reconstruction field including said portion of said object beyond said measuring field.

9. A method as claimed in claim 8 wherein the step of reconstructing said image includes obtaining data relating to a region of said reconstruction field lying outside of said measuring field by extrapolating said data represented by said electronic signals from said measuring field.

10. A method as claimed in claim 9 comprising producing a plurality of cut projections by said displacement of said focus and wherein said data represented by said electrical signals includes data corresponding to said cut projections, and wherein the step of extrapolating said data comprises extrapolating said data corresponding to said cut projections.

11. A method as claimed in claim 8 comprising producing a circular measuring field by displacing said focus relative to said system axis, and wherein the step of reconstructing said image comprises reconstructing an image with reference to a reconstruction field that is circular and that is concentric with said measuring field.

12. A computed tomography apparatus as claimed in claim 11 wherein the step of displacing said focus relative to said system axis comprises rotating said focus on a circular path around said system axis.

13. A method as claimed in claim 8 wherein the step of emitting a radiation beam comprises emitting an X-ray radiation beam from a focus of an X-ray source.

* * * * *